United States Patent
Gibble et al.

(10) Patent No.: US 6,889,302 B2
(45) Date of Patent: May 3, 2005

(54) APPARATUS AND METHOD TO MAINTAIN INFORMATION IN ONE OR MORE VIRTUAL VOLUME AGGREGATES COMPRISING A PLURALITY OF VIRTUAL VOLUMES

(75) Inventors: Kevin L. Gibble, Tucson, AZ (US); Gregory T. Kishi, Oro Valley, AZ (US); David L. Patterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 10/230,826

(22) Filed: Aug. 29, 2002

(65) Prior Publication Data

US 2004/0044860 A1 Mar. 4, 2004

(51) Int. Cl.$^7$ ............................................. G06F 122/00
(52) U.S. Cl. ...................... 711/170; 711/171; 711/172; 711/173; 711/203
(58) Field of Search ................................ 711/170, 171, 711/172, 173, 203, 160, 154, 114

(56) References Cited

U.S. PATENT DOCUMENTS

| 5,125,086 A | 6/1992 | Perazzoli, Jr. ............... 395/425 |
| 5,155,835 A | 10/1992 | Belsan ........................ 395/425 |
| 5,418,921 A | 5/1995 | Cortney et al. .............. 395/425 |
| 5,537,585 A | 7/1996 | Blickenstaff et al. ....... 395/600 |
| 5,551,002 A | 8/1996 | Rosich et al. ............... 395/461 |
| 5,650,969 A | 7/1997 | Niijima et al. ............... 365/200 |
| 5,727,181 A | 3/1998 | Beglin et al. ................ 395/441 |
| 5,875,454 A | 2/1999 | Craft et al. .................. 711/113 |
| 6,003,114 A | 12/1999 | Bachmat ...................... 711/113 |
| 6,141,737 A | 10/2000 | Krantz et al. ................ 711/717 |
| 6,192,450 B1 | 2/2001 | Bauman et al. ............. 711/135 |
| 6,311,252 B1 | 10/2001 | Raz ............................. 711/117 |
| 6,336,163 B1 | 1/2002 | Brewer et al. ............... 711/112 |
| 2002/0040419 A1 | 4/2002 | Nishikawa et al. ......... 711/114 |
| 2004/0044826 A1 * | 3/2004 | Dawson et al. ................ 711/4 |
| 2004/0044851 A1 * | 3/2004 | Dawson et al. ............. 711/154 |

* cited by examiner

Primary Examiner—Mano Padmanabhan
Assistant Examiner—Mehdi Namazi
(74) Attorney, Agent, or Firm—Dale F. Regelman

(57) ABSTRACT

A method and apparatus for maintaining information in one or more virtual volume aggregates comprising a plurality of virtual volumes. The method maintains a plurality of virtual volumes in a first information storage medium, and forms one or more virtual volume aggregates, where each of the of virtual volumes is assigned to one of the virtual volume aggregates. The method further provides a plurality of second information storage media. The method then identifies the least recently used virtual volume, and writes the virtual volume aggregate comprising that least recently used virtual volume to one or more second information storage media. Thereafter, the method determines if space is required on said first information storage medium. If space is required on said first information storage medium, the method selects the virtual volume aggregate comprising the least recently used virtual volume and removes from said first information storage medium each virtual volume in that selected virtual volume aggregate that has been written to one or more second information storage media.

24 Claims, 9 Drawing Sheets

FIG. 8

| POOL 1 | POOL 2 | POOL 3 | POOL 4 |
|---|---|---|---|
| ①~712 | ②~732 | ③~752 | ④~772 |
| ⑤~714 | ⑥~734 | ⑦~754 | ⑧~774 |
| ⑨~716 | ⑩~736 | ⑪~756 | ⑫~776 |
| ⑬~718 | ⑭~738 | ⑮~758 | ⑯~778 |

710    730    750    770

APPARATUS AND METHOD TO MAINTAIN INFORMATION IN ONE OR MORE VIRTUAL VOLUME AGGREGATES COMPRISING A PLURALITY OF VIRTUAL VOLUMES

FIELD OF THE INVENTION

Applicant's invention relates to an apparatus and method to maintain computer files in one or more virtual volume aggregates, where each of those virtual volume aggregates includes a plurality of individual virtual volumes.

BACKGROUND OF THE INVENTION

In hierarchical computer storage systems, intensively used and fast storage is paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method and apparatus for maintaining information in one or more virtual volume aggregates comprising a plurality of virtual volumes. Applicants' method maintains a plurality of virtual volumes in a first information storage medium, and forms one or more virtual volume aggregates, where each of the of virtual volumes is assigned to one of the virtual volume aggregates. Applicants' method further provides a plurality of second information storage media. Applicants' method then identifies the least recently used virtual volume, and writes the virtual volume aggregate comprising that least recently used virtual volume to one or more second information storage media.

Thereafter, Applicants' method determines if space is required on said first information storage medium. If space is required on said first information storage medium, Applicants' method selects the virtual volume aggregate comprising the least recently used virtual volume and removes from said first information storage medium each virtual volume in that selected virtual volume aggregate that has been written to one or more second information storage media.

BRIEF DESCRIPTION OF THE DRAWINGS

The invention will be better understood from a reading of the following detailed description taken in conjunction with the drawings in which like reference designators are used to designate like elements, and in which:

FIG. 8 is a histogram showing least recently accessed ("LRU") rankings for the plurality of virtual volumes of FIG. 7;

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
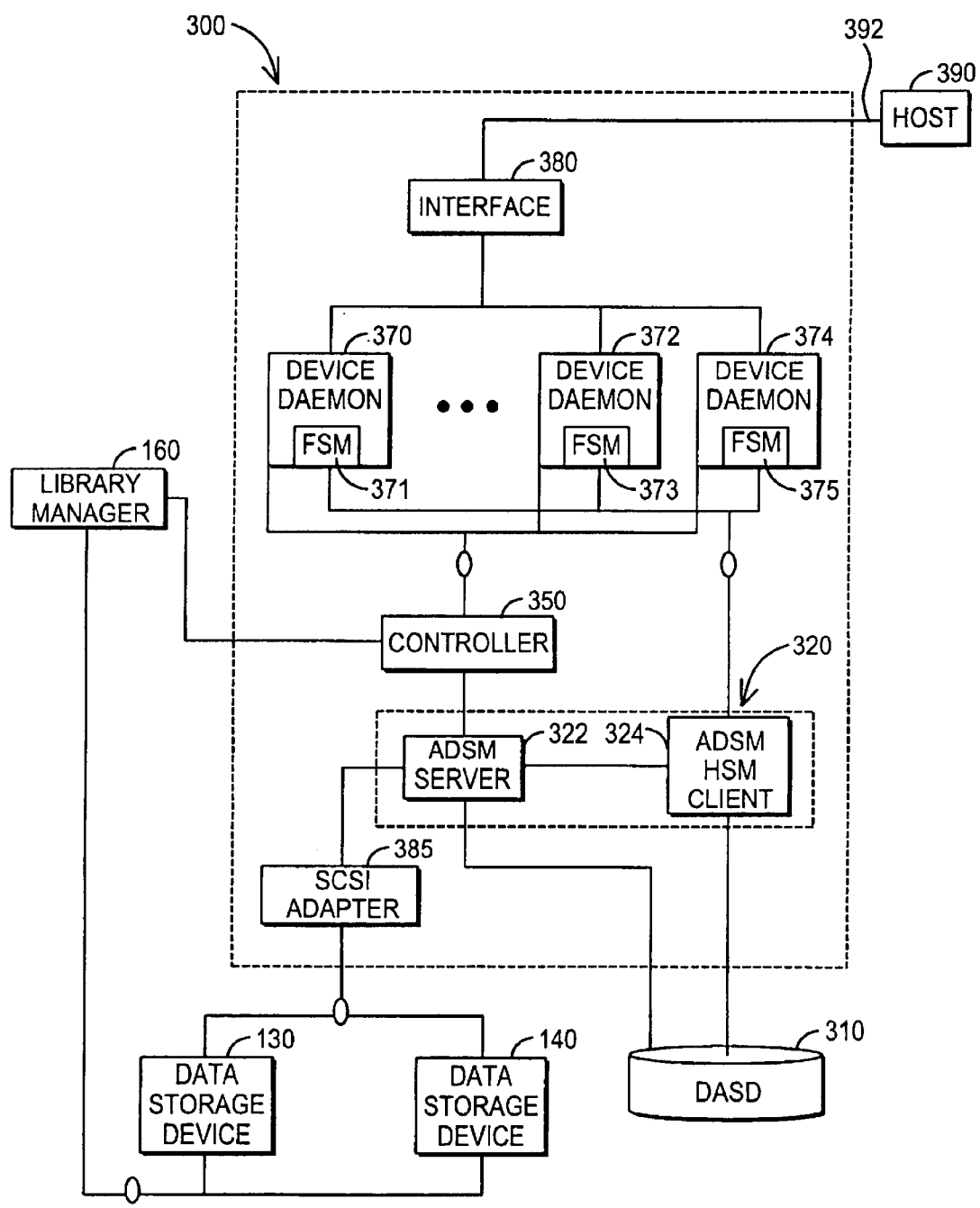
FIG. 3 is a block diagram showing the components of Applicants' virtual tape server.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/ 200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 130 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
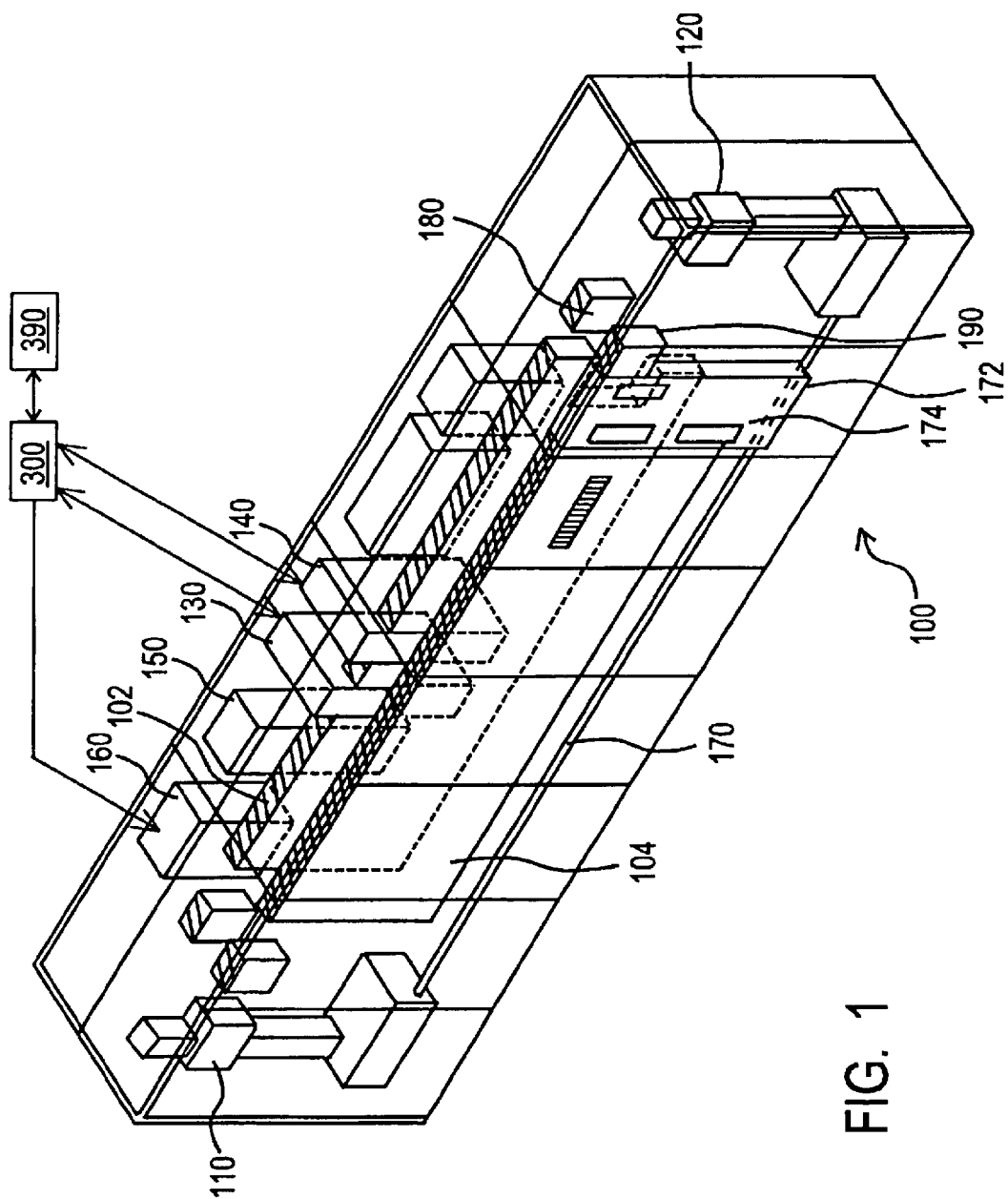
FIG. 1 is a perspective view of a first embodiment of Applicant's data storage and retrieval system.
Figure 2:
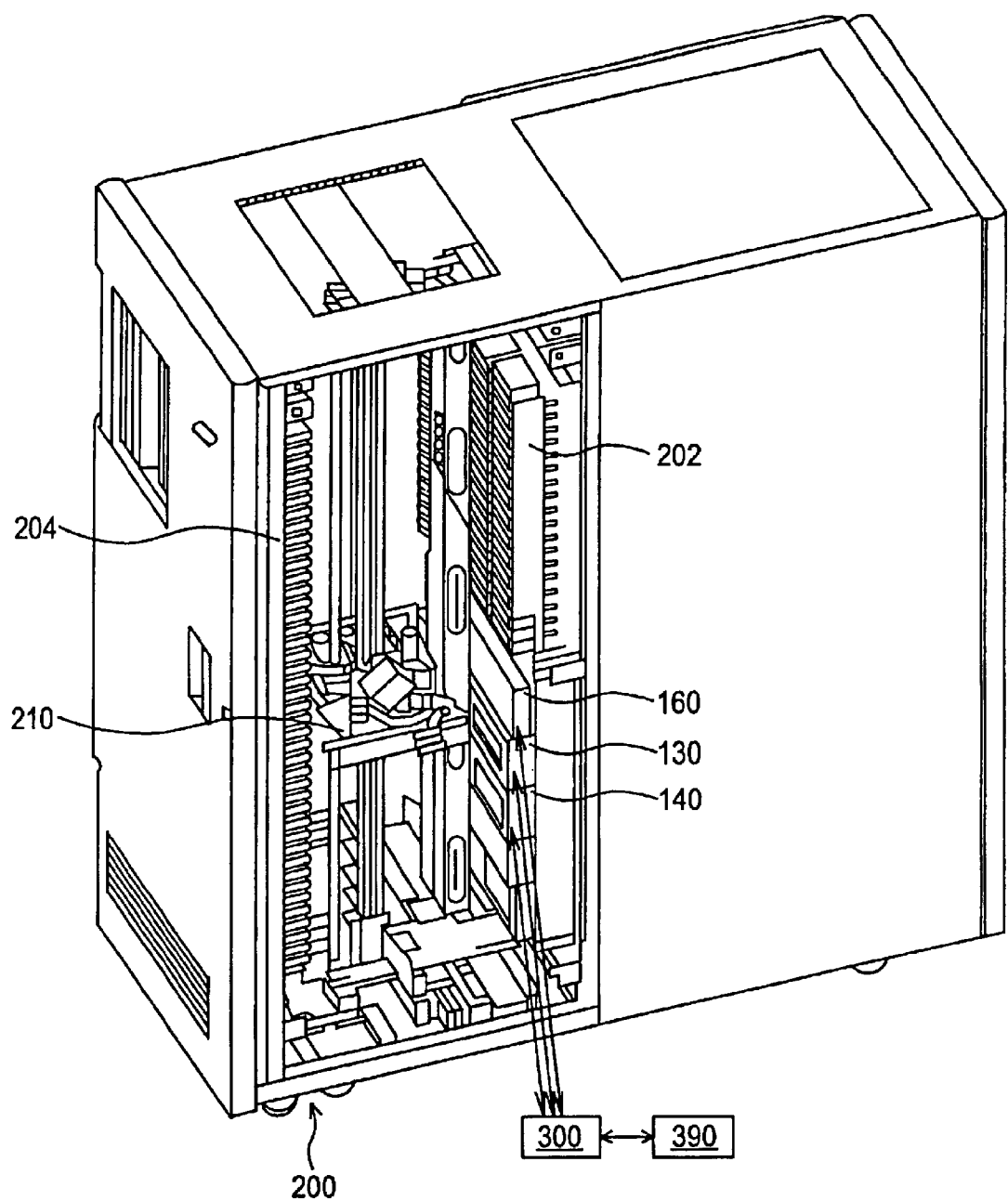
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes one or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Referring again to FIG. 3, virtual volumes that are frequently accessed by host 390 are maintained in DASD 310. Therefore, at any given time a plurality of virtual volumes are stored in DASD 310. Virtual volumes that are less frequently accessed may be written to one or more second information storage media using data storage devices 130/ 140. Such second information storage media include magnetic storage media, optical storage media, electronic storage media, and combinations thereof.

Figure 6:
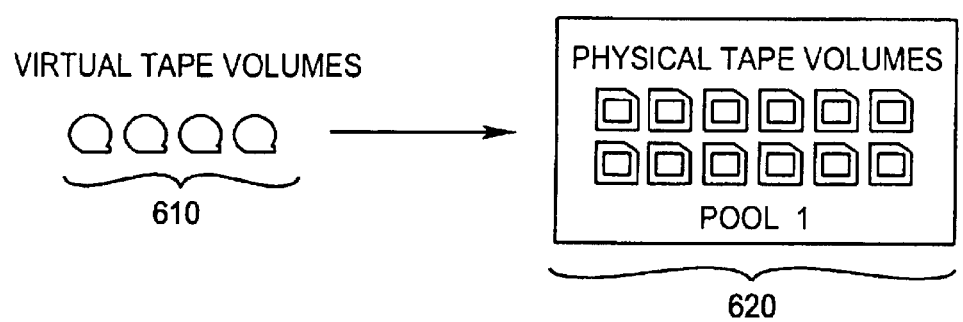
FIG. 6 is a block diagram depicting prior art methods to write a plurality of virtual volumes to a plurality of physical volumes.

Referring now to FIG. 6, using prior art methods the plurality of virtual volumes 610 stored in DASD 310 (FIG. 3) are written to plurality of second information storage media 620, where that plurality of second information storage media 620 comprise a single "pool" of media. By single "pool," Applicants mean that even though each of the identical physical volumes comprising pool 620 include an individual volume serial number ("VOLSER"), those individual physical volumes do not otherwise comprise two or more differentiated aggregate groupings.

Using Applicants' method, the plurality of virtual volumes 610 comprise (M) virtual volume aggregates. For example, in the embodiment of FIG. 7 (M) equals 4. Plurality of virtual volumes 610 includes a first virtual volume aggregate 710, a second virtual volume aggregate 730, a third virtual volume aggregate 750, and a fourth virtual volume aggregate 770.

The individual virtual volumes comprising virtual volume aggregate 710 may comprise a first type of data file, and the individual virtual volumes comprising virtual volume aggregate 730 may comprise a first type of data file, and the individual virtual volumes comprising virtual volume aggregate 750 may comprise a third type of data file, and the individual virtual volumes comprising virtual volume aggregate 770 may comprise a fourth type of data file. Alternatively, the individual virtual volumes comprising virtual volume aggregate 710 may comprise a first customer's data, and the individual virtual volumes comprising virtual volume aggregate 730 may comprise a second customer's data, and the individual virtual volumes comprising virtual volume aggregate 750 may comprise a third customer's data, and the individual virtual volumes comprising virtual volume aggregate 770 may comprise a fourth customer's data.

Figure 7:
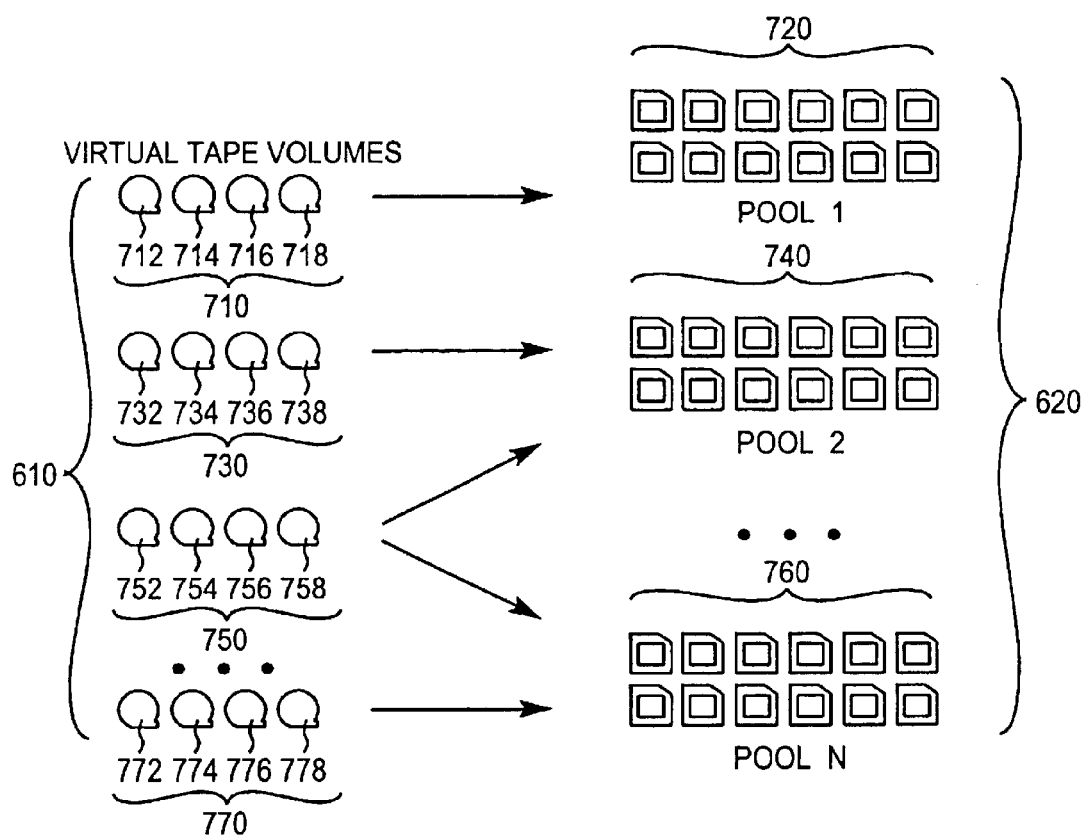
FIG. 7 is a block diagram showing Applicants' method to write a plurality of virtual volumes to a plurality of physical volumes.

Again using Applicants' method, in the embodiment of FIG. 7 the plurality of physical volumes 620 comprise a first physical volume pool 720, a second physical volume pool 740, and a third physical volume pool 760. Further according to the embodiment of FIG. 7, virtual volume aggregate 750 is written to physical volume pool 740 and to physical volume pool 760. In certain embodiments, physical volume pool 740 may be stored in a first data storage and retrieval system having a first location and physical volume pool 760 may be stored in a second data storage and retrieval system having a second location, where the first location differs from the second location.

Referring again to FIG. 3, virtual volumes that are frequently accessed by host 390 are maintained in DASD 310. Therefore, at any given time a plurality of virtual volumes are stored in DASD 310. In order to make DASD space available for new logical volumes, periodically one or more current logical volumes must be removed from the DASD. Prior to removing a logical volume from the DASD, that logical volume is first written to one or more physical volumes. This process is sometimes referred as "premigrating" the logical volume. Virtual volumes that are less frequently accessed are premigrated to one or more second information storage media using, for example, data storage devices 130/140. Such second information storage media include magnetic storage media, optical storage media, electronic storage media, and combinations thereof.

After a logical volume has been premigrated, that logical volume can be "stubbed" from the DASD. Stubbing means removing the logical volume from the DASD, and maintaining a pointer in the DASD which indicates, inter alia, the one or more second information storage media, i.e. physical volumes, to which the logical volume is written.

Figure 4:
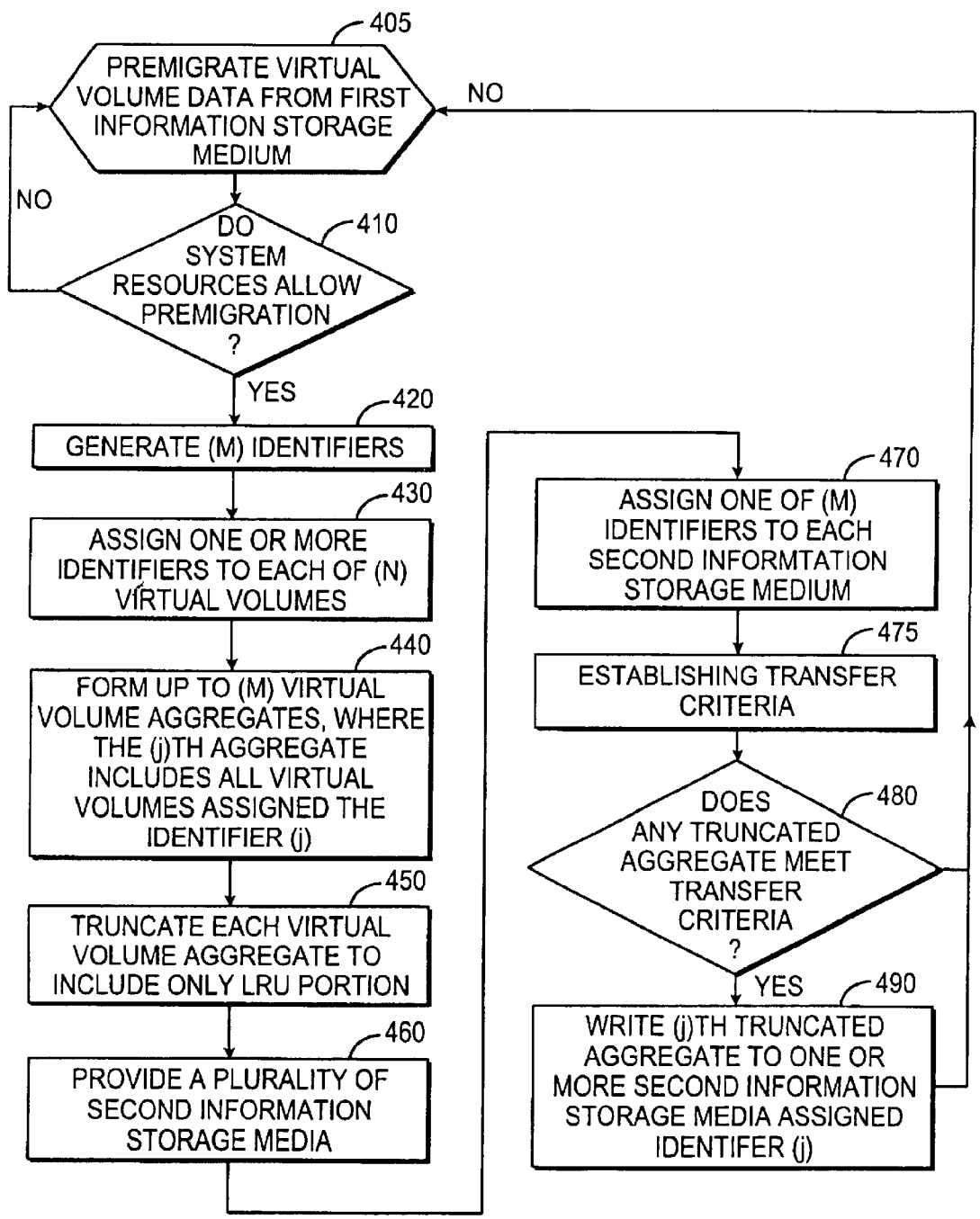
FIG. 4 is a flow chart summarizing the initial steps in Applicants' method.

FIG. 4 summarizes the initial steps in Applicants' method to premigrate virtual volume data from a first information storage medium using one or more virtual volume aggregates. In certain embodiments, the first information storage medium comprises a DASD, such as DASD 310 (FIG. 3). Referring now to FIGS. 4 and 7, in step 405 Applicants' method maintains (N) virtual volumes in one or more first information storage media. In certain embodiments, such one or more information storage media include DASD 310 (FIG. 3).

In step 410, Applicants' method determines if system resources allow premigration. In certain embodiments, such a determination includes, for example, whether one or more data storage devices are available, whether one or more physical volumes are available, and the like. If Applicants' method determines in step 410 that sufficient system resources are not available to premigrate one or more logical volumes, then Applicants' method transitions from step 410 to step 405 wherein Applicants' method monitors the availability of system resources. When sufficient system resources become available, then Applicants' method transitions from step 410 to step 420.

In step 420, Applicants' method generates (M) identifiers, where (M) is greater than 2. In certain embodiments, (M) is greater than 10. In certain embodiments, (M) is greater than 20. In certain embodiments, (M) is greater than 30. In certain embodiments, (M) is 34. In step 430, Applicants' method assigns one of the (M) identifiers to each of the (N) virtual volumes.

For example, in the embodiment of FIG. 7, (M) equals 4. In certain embodiments, those four (4) identifiers comprise "1", "2", "3", and "4". In step 430, Applicants' method assigns one of the (M) identifiers to each of the (N) virtual volumes. For example, in the embodiment of FIG. 7 virtual volumes 712, 714, 716, and 718, are assigned the identifier "1." Virtual volumes 722, 724, 726, and 728, are assigned the identifier "2." Virtual volumes 732, 734, 736, and 738, are assigned the identifier "3." Virtual volumes 742, 744, 746, and 748, are assigned the identifier "4."

Applicants' method transitions from step 430 to step 440 wherein Applicants' method forms up to (M) virtual volume aggregates, where the (j)th virtual volume aggregate includes all the virtual volumes assigned the identifier (j). For example in the embodiment of FIG. 7, virtual volume aggregate 1 comprises virtual volumes 712, 714, 716, and 718. Virtual volume aggregate 2 comprises virtual volumes 722, 724, 726, and 728. Virtual volume aggregate 3 comprises virtual volumes 732, 734, 736, and 738. Virtual volume aggregate 4 comprises virtual volumes 742, 744, 746, and 748.

In step 450, Applicants' method truncates the (j)th virtual volume aggregate to include only the least recently used logical volumes comprising that aggregate, i.e. the LRU portion. In certain embodiments, Applicants' method maintains a histogram for the (N) virtual volumes, where that histogram indicates the time each virtual volume was last accessed. The virtual volumes in the each virtual volume aggregate having the earliest time of last access comprise the LRU portion of that aggregate. In certain embodiments, Applicants' method maintains (N) timestamps for the (N) virtual volumes, where the (i)th timestamp comprises the time the (i)th virtual volume was last accessed. Virtual volumes in the each virtual volume aggregate having the earliest timestamp comprise the LRU portion of that aggregate.

Further in step 450, Applicants' method assigns each of the (N) virtual volumes an LRU ranking such that the virtual volume having the earliest time of last access is assigned an LRU ranking of 1 and the virtual volume having the latest time of last access is assigned an LRU ranking of (N) with the remaining (N−2) virtual volumes being assigned an LRU ranking between 2 and (N−1) based upon their respective times of last access values.

For example and referring to FIGS. 4 and 8, FIG. 8 comprises a histogram for virtual volumes 610. In step 450 Applicants' method assigns the LRU rankings shown in FIG. 8 to each of the plurality of virtual volumes 610 (FIGS. 6, 7). In the embodiment of FIGS. 7 and 8, virtual volume 712 has the earliest time of last access, and therefore, is assigned an LRU ranking of 1. Virtual volume 778 has the latest time of last access, and therefore, is assigned an LRU ranking of 16.

Applicants' method uses a plurality of factors in step 450 to truncate each virtual volume aggregate to an LRU portion. These factors include, without limitation, the number of infrequently accessed virtual volumes being maintained in the first information storage medium, the availability of second information storage media, the amount of space in the first information storage medium needed for new virtual volumes, and the like. In some implementations, the virtual volume aggregate will be truncated to meet or barely exceed the transfer criteria used in step 475.

In step 460 Applicants' method provides a plurality of second information storage media. In certain embodiments, such second information storage media include magnetic storage media such as magnetic disks, magnetic tapes, and the like. In certain embodiments, such second information storage media include optical storage media such as CD/DVD-ROM media, CD/DVD-WORM media, CD/DVD-RW media, and the like. In certain embodiments, such second information storage media include electronic storage media including a device such as a PROM, EPROM, EEPROM, Flash PROM, compactflash, smartmedia, and the like.

In step 470 Applicants' method assigns one of the (M) identifiers of step 420 to each of the plurality of second information storage media. Thus, in step 470 Applicants' method creates (M) pools of physical volumes.

In step 475, Applicants' method establishes transfer criteria. In certain embodiments, step 475 includes setting a minimum transfer size ("MTS"). Applicants have found that it is not time efficient to premigrate and stub small virtual volume aggregates. Virtual volume aggregates larger than the MTS are premigrated and stubbed. Virtual volume aggregates smaller than the MTS are not premigrated or stubbed. In certain embodiments, the transfer criteria of step 475 includes a specified time interval since last access.

In step 480, Applicants' method determines if one or more of the truncated virtual volume aggregates meets the transfer criteria of step 475. For example, in certain embodiments Applicants' method determines in step 480 if one or more truncated aggregates is larger than a minimum transfer size. In certain embodiments, Applicants' method determines in step 480 if one or more of the virtual volume aggregates includes a virtual volume which has not been accessed for a specified time period. If Applicants' method determines in step 480 that none of the truncated virtual volume aggregates meet the transfer criteria of step 475, then Applicants' method transitions from step 480 to step 405 and continues.

Alternatively, if Applicants' method determines in step 480 that one or more truncated virtual volume aggregates meet the transfer criteria, then in step 490 Applicants' method selects one of the qualifying truncated virtual volume aggregates and transfers it to one or more second information storage media. In certain embodiments, in step 490 the selected truncated virtual volume aggregate is the one containing the oldest virtual volume (LRU).

Figure 5:
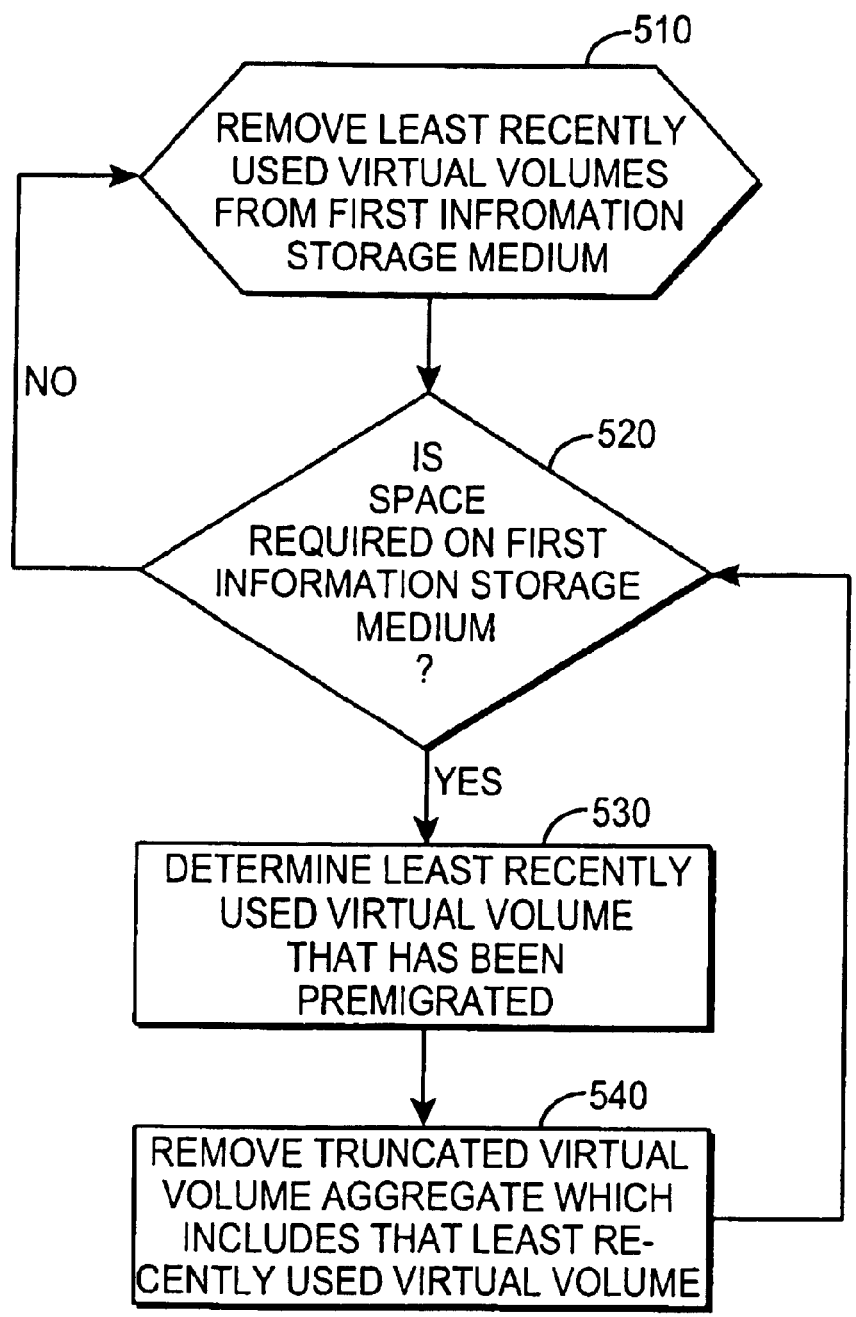
FIG. 5 is a flow chart summarizing additional steps in Applicants' method.

FIG. 5 summarizes the steps in Applicants' method to provide additional storage space on the first information storage medium, i.e. in the DASD, by removing one or more least recently used logical volumes therefrom. As those skilled in the art will appreciate, removing one or more existing logical volumes from the first information storage medium will provide storage capability for new logical volumes. In certain embodiments, Applicants' method stubs those one or more existing logical volumes. By "stub," Applicants mean removing those one or more virtual volumes from the DASD, and maintaining in the DASD a plurality of pointers, where each of those pointers comprises information regarding the one or more physical volumes now comprising the removed logical volume.

In step 510, Applicants' method maintains a plurality of logical volumes in a first information storage medium where one or more of those logical volumes has been premigrated. By premigrating, Applicants mean writing that logical volume to one or more second information storage media. In certain embodiments, those one or more second information storage media comprise one or more physical volumes.

In step 520, Applicants' method determines if additional space is required in the first information storage medium, i.e. in the DASD. If Applicants' method determines in step 520 that additional DASD space is not needed, then Applicants' method transitions from step 520 to step 510 and monitors DASD space requirements.

If Applicants' method determines in step 520 that additional space in the first information storage medium is needed, then Applicants' method transitions from step 520 to step 530 wherein Applicants' method identifies the least recently used virtual volume maintained in the first information storage medium that is premigrated. Applicants' method transitions from step 530 to step 540 wherein Applicants' method removes the premigrated virtual volume. In certain embodiments, step 540 further includes setting a pointer in the first information storage medium for the removed virtual volume, where that pointer indicates the one or more second information storage media comprising the removed virtual volume.

Applicants' method transitions from step 540 to step 520 wherein Applicants' method determines if additional first information storage medium space is required. If Applicants' method determines that additional first information storage medium space is required, then Applicants' method transitions from step 520 to step 530 and continues. Alternatively, if Applicants' method determines in step 520 that no additional first information storage medium space is needed, then Applicants' method transitions from step 520 to step 510 and continues to monitor first information storage medium space requirements.

As an example and referring to the embodiment of FIGS. 7 and 8, in the first iteration of the steps in FIG. 5 Applicants' method in step 530 determines the premigrated virtual volume having the oldest timestamp, i.e. virtual volume 712. If Applicants' method determines that virtual volume 712 has been premigrated, then Applicants' method transitions from step 530 to step 540 wherein Applicants' method removes from the first information storage medium virtual volume 712. In this example, Applicants' method transitions from step 540 to step 520.

If Applicants' method determines in step 520 that additional DASD space is required, Applicants' method transitions from step 520 to step 530 wherein Applicants' method selects the least recently used premigrated virtual volume, i.e. virtual volume 732. In step 540, Applicants' method removes from the first information storage medium virtual volume 732.

Figure 9:
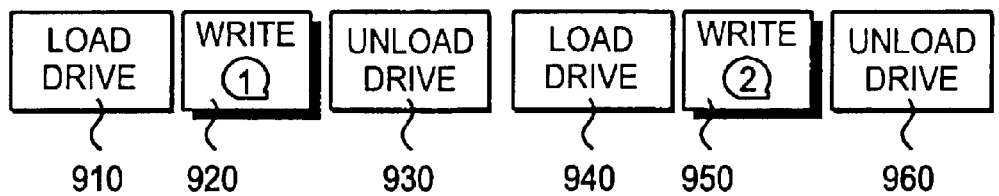
FIG. 9 shows one method of writing the LRU-ranked virtual volumes of FIG. 8 to physical volumes.

FIG. 9 summarizes the steps required using prior art methods to premigrate virtual volume aggregates 710 and 730 to two different pools of physical volumes. In step 910, one or more physical volumes assigned the identifier "1" is mounted in a data storage device, such as device 130/140. In step 920, virtual volume 712 is written to that mounted physical volume. Thereafter in step 930 the physical volume now comprising virtual volume 712 is demounted and stored. In step 940 one or more physical volumes assigned the identifier "2" are mounted. In step 950 virtual volume 732 is written to those one or more mounted physical volumes. Thereafter in step 960 those one or more physical volumes are demounted and stored. The process proceeds sequentially until all of the eight volumes have been copied. As those skilled in the art will appreciate, such a process of writing those 8 virtual volumes to two pools of physical volumes is time inefficient.

Figure 10:
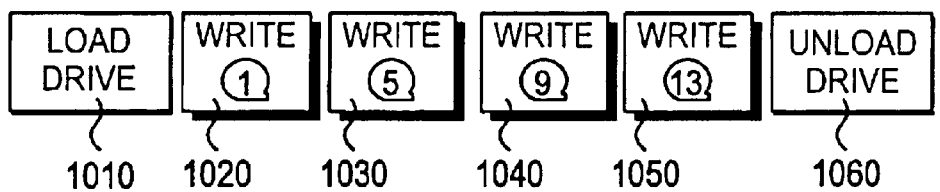
FIG. 10 shows a second method of writing the LRU-ranked virtual volumes of FIG. 8 to physical volumes.

Applicants' method, however, premigrates the least recently used virtual volumes as virtual volume aggregates. For example, in the example above, Applicants' method first writes each of the virtual volumes comprising pool 710 to a first pool of physical volumes. Applicants' method then writes each of the virtual volumes comprising pool 730 to a second pool of physical volumes. Referring to FIG. 10, in step 1010 a physical volume assigned the identifier "1" is mounted. In step 1020, virtual volume 712, having identifier 1 and LRU ranking 1, is written to that mounted physical volume. In step 1030, virtual volume 714, having identifier 1 and LRU ranking 5, is written to the already mounted physical volume. In step 1040, virtual volume 716, having identifier 1 and LRU ranking 9, is written to the mounted physical volume. In step 1050, virtual volume 718, having identifier 1 and LRU ranking 718, is written to the mounted physical volume. In essence, in steps 1020 through 1050 a first virtual volume aggregate is written to one or more physical volumes.

In step 1060, the physical volume now comprising virtual volumes 712, 714, 716, and 718, is demounted and stored. In the event that one or more additional second information storage media are needed to write virtual volumes 712, 714, 716, and 718, to physical volumes, then the first mounted second information storage medium is replaced sequentially with one or more additional second information storage media having been assigned the identifier "1". In a similar fashion, Applicants' method writes virtual volume aggregate 730 to one or more physical volumes comprising a second physical volume pool.

The embodiments of Applicants' method recited in FIGS. 4 and/or 5 may be implemented separately. For example, one embodiment may include only the steps of FIG. 4. Another embodiment may utilize the steps of FIG. 5. Moreover, in certain embodiments, the individual steps recited in FIGS. 4 and/or 5 may be combined, eliminated, or reordered.

Applicants' invention includes an article of manufacture comprising a computer useable medium having computer readable program code disposed therein for maintaining (N) virtual volumes in one or more virtual volume aggregates. Applicants' invention further includes computer program products embodied as program code stored in one or more memory devices, such as a magnetic disk, a magnetic tape, or other non-volatile memory device, to maintain (N) virtual volumes in one or more virtual volume aggregates.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for maintaining information in one or more virtual volume aggregates, comprising the steps of:

maintaining (N) virtual volumes in a first information storage medium comprising a direct access storage device file buffers; N≧1 forming one or more virtual volume aagregates, wherein each of said plurality of virtual volumes is assigned to one of said one or more virtual volume aggregates;

providing a plurality (M) of second information storage media;

identifying the least recently used virtual volume; and writing the virtual volume aggregate comprising said least recently used virtual volume to one or more second information storage media;

generating (M) identifiers, wherein (M) is greater than 1;

assigning an identifier (j) to one or more of said (N) virtual volumes, wherein (j) is greater than or equal to 1 and less than or equal to (M);

assigning one of said (M) identifiers to each of said plurality of second information storage media; and writing one or more least recently used virtual volumes assigned the identifier (j) to one or more second information storage media assigned the identifier (j).

2. The method of claim 1, further comprising the steps of:

maintaining a histogram showing the times each of said (N) virtual volumes was last accessed; and assigning an LRU ranking to each of said (N) virtual volumes using said histogram.

3. The method of claim 1, further comprising the step of:

maintaining (N) timestamps, wherein the (i)th timestamp comprises the time the (i)th virtual volume was last accessed, wherein (i) is greater than or equal to 1 and less than or equal to (N); and assigning an LRU ranking (k) to each of said (N) virtual volumes using said (N) timestamps.

4. The method of claim 3, further comprising the steps of:

determining the LRU portion of each of said (N) virtual volume aggregates; and truncating each of said (N) virtual volume aggregates to include only said LRU portion.

5. The method of claim 4, wherein further comprising the steps of:

establishing transfer criteria;

selecting the truncated virtual volume aggregate comprising the oldest LRU virtual volume;

determining if said selected truncated virtual volume aggregates meets said transfer criteria;

operative if the selected truncated virtual volume aggregate meets said transfer criteria, writing the selected virtual volume aggregate to one or more second information storage media assigned the identifier (j).

6. The method of claim 5, wherein said transfer criteria comprises a minimum transfer size.

7. The method of claim 1, further comprising the steps of:
determining if space is required on said first information storage medium;
operative if space is required on said first information storage medium:
selecting the oldest LRU virtual volume that has been written to one or more second information storage media;
removing said selected LRU virtual volume from said first information storage medium.

8. A method for maintaining information in one or more virtual volume aggregates, comprising the steps of:
maintaining a plurality of virtual volumes in a first information storage medium;
forming one or more virtual volume aggregates, wherein each of said plurality of virtual volumes is assigned to one or more virtual volume aggregates;
providing a plurality of second information storage media;
identifying the least recently used virtual volume;
writing the virtual volume aggregate comprising said least recently used virtual volume to one or more second information storage media;
determining if space is required on said first information storage medium;
operative if space is required on said first information storage medium;
selecting the virtual volume aggregate comprising the least recently used virtual volume;
removing from said first information storage medium each virtual volume in said selected virtual volume aggregate that has been written to one or more second information storage media.

9. An article of manufacture comprising a computer useable medium having computer readable program code disposed therein to maintain a plurality of virtual volumes in one or more virtual volume aggregates, the computer readable program code comprising a series of computer readable program steps to effect:
maintaining (N) virtual volumes in a first information storage medium comprising a direct access storage device file buffers; $N \geq 1$
forming one or more virtual volume aggregates, wherein each of said plurality of virtual volumes is assigned to one of said one or more virtual volume aggregates;
providing a plurality (M) of second information storage media;
identifying the least recently used virtual volume; and
writing the virtual volume aagregate comprising said least recently used virtual volume to one or more second information storage media;
generating (M) identifiers, wherein (M) is greater than 1;
assigning an identifier (j) to one or more of said (N) virtual volumes, wherein (j) is greater than or equal to 1 and less than or equal to (M);
assigning one of said (M) identifiers to each of said plurality of second information storage media; and
writing one or more least recently used virtual volumes assigned the identifier (j) to one or more second information storage media assigned the identifier (j).

10. The article of manufacture of claim 9, wherein said computer readable program code further comprises a series of computer readable program steps to effect:
maintaining a histogram showing the times each of said (N) virtual volumes was last accessed; and
assigning an LRU ranking to each of said (N) virtual volumes using said histogram.

11. The article of manufacture of claim 9, wherein said computer readable program code further comprises a series of computer readable program steps to effect:
maintaining (N) timestamps, wherein the (i)th timestamp comprises the time the (i)th virtual volume was last accessed, wherein (i) is greater than or equal to 1 and less than or equal to (N); and
assigning an LRU ranking (k) to each of said (N) virtual volumes using said (N) timestamps.

12. The article of manufacture of claim 11, wherein said computer readable program code further comprises a series of computer readable program steps to effect:
determining a least recently used portion of each of said (N) virtual volume aggregates; and
truncating each of said (N) virtual volume aggregates to include only said LRU portion.

13. The article of manufacture of claim 12, wherein said computer readable program code further comprises a series of computer readable program steps to effect:
establishing transfer criteria;
selecting the truncated virtual volume aggregate comprising the oldest LRU virtual volume;
determining if said selected truncated virtual volume aggregates meets said transfer criteria;
operative if the selected truncated virtual volume aggregate meets said transfer criteria, writing the selected virtual volume aggregate to one or more second information storage media assigned the identifier (j).

14. The article of manufacture of claim 13, wherein said transfer criteria comprises a minimum transfer size.

15. The article of manufacture of claim 9, wherein said computer readable program code further comprises a series of computer readable program steps to effect:
determining if space is required on said first information storage medium;
operative if space is required on said first information storage medium;
selecting the oldest LRU virtual volume that has been written to one or more second information storage media;
removing said selected LRU virtual volume from said first information storage medium.

16. An article of manufacture comprising a computer useable medium having computer readable program code disposed therein to maintain a plurality of virtual volumes in one or more virtual volume aggregates, the computer readable program code comprising a series of computer readable program steps to effect:
maintaining a plurality of virtual volumes in a first information storage medium;
forming one or more virtual volume aggregates, wherein each of said plurality of virtual volumes is assigned to one or more virtual volume aggregates;
providing a plurality of second information storage media;
identifying the least recently used virtual volume;
writing the virtual volume aggregate comprising said least recently used virtual volume to one or more second information storage media;

determining if space is required on said first information storage medium;

operative if space is required on said first information storage medium;

selecting the virtual volume aggregate comprising the least recently used virtual volume;

removing from said first information storage medium each virtual volume in said selected virtual volume aggregate that has been written to one or more second information storage media.

17. A computer program product usable with a programmable computer processor having computer readable program code embodied therein to maintain a plurality of virtual volumes in one or more virtual volume aggregates, comprising:

computer readable program code which causes said programmable computer processor to maintain (N) virtual volumes in a first information storage medium comprising a direct access storage device file buffers; N≧1 computer readable program code which causes said programmable computer processor to form one or more virtual volume aggregates, wherein each of said plurality of virtual volumes is assigned to one of said one or more virtual volume aggregates;

computer readable program code which causes said programmable computer processor to identify the least recently used virtual volume; and computer readable program code which causes said programmable computer processor to write the virtual volume aagregate comprising said least recently used virtual volume to one or more (M) second information storage media;

computer readable program code which causes said programmable computer processor to generate (M) identifiers, wherein (M) is greater than 1;

computer readable program code which causes said programmable computer processor to assign an identifier (j) to one or more of said (N) virtual volumes, wherein (j) is greater than or equal to 1 and less than or equal to (M);

computer readable program code which causes said programmable computer processor to assign one of said (M) identifiers to each of said plurality of second information storage media; and computer readable program code which causes said programmable computer processor to write one or more least recently used virtual volumes assigned the identifier (j) to one or more second information storage media assigned the identifier (j).

18. The computer program product of claim 17, further comprising:

computer readable program code which causes said programmable computer processor to maintain a histogram showing the times each of said (N) virtual volumes was last accessed; and computer readable program code which causes said programmable computer processor to assign an LRU ranking to each of said (N) virtual volumes using said histogram.

19. The computer program product of claim 17, further comprising:

computer readable program code which causes said programmable computer processor to maintain (N) timestamps, wherein the (i)th timestamp comprises the time the (i)th virtual volume was last accessed, wherein (i) is greater than or equal to 1 and less than or equal to (N); and computer readable program code which causes said programmable computer processor to assign an LRU ranking to each of said (N) virtual volumes using said (N) timestamps.

20. The computer program product of claim 19, further comprising:

computer readable program code which causes said programmable computer processor to determine an LRU portion of each of said (N) virtual volume aggregates using said LRU rankings; and computer readable program code which causes said programmable computer processor to truncate each of said (N) virtual volume aggregates to its LRU portion.

21. The computer program product of claim 20, further comprising:

computer readable program code which causes said programmable computer processor to establish transfer criteria;

computer readable program code which causes said programmable computer processor to select the truncated virtual volume aggregate comprising the oldest LRU virtual volume;

computer readable program code which causes said programmable computer processor to determine if said selected truncated virtual volume aggregates meets said transfer criteria;

computer readable program code which, if said selected truncated virtual volume aggregate meets said transfer criteria, causes said programmable computer processor to write said selected virtual volume aggregate to one or more second information storage media assigned the identifier (j).

22. The computer program product of claim 21, wherein said transfer criteria comprises a minimum transfer size.

23. The computer program product of claim 21, further comprising:

computer readable program code which causes said programmable computer processor to determine if space is required on said first information storage medium;

computer readable program code which, if space is required on said first information storage medium, causes said programmable computer processor to select the oldest LRU virtual volume that has been written to one or more second information storage media, and to remove said selected LRU virtual volume from said first information storage medium.

24. A computer program product usable with a programmable computer processor having computer readable program code embodied therein to maintain a plurality of virtual volumes in one or more virtual volume aggregates, comprising:

computer readable program code which causes said programmable computer processor to maintain a plurality of virtual volumes in a first information storage medium;

computer readable program code which causes said programmable computer processor to form one or more virtual volume aggregates, wherein each of said plurality of virtual volumes is assigned to one of said one or more virtual volume aggregates;

computer readable program code which causes said programmable computer processor to provide a plurality of second information storage media;

computer readable program code which causes said programmable computer processor to identify the least recently used virtual volume;

computer readable program code which causes programmable computer processor to write the virtual volume aggregate comprising said least recently used virtual volume to one or more second information storage media;

computer readable program code which causes said programmable computer processor to determine if space is required on said first information storage medium;

computer readable program code which, if space is required on said first information storage medium, causes said programmable computer processor to select the virtual volume aggregate comprising the least recently used virtual volume, and to remove from said first information storage medium each virtual volume in said selected virtual volume aggregate that has been written to one or more second information storage media.

* * * * *